United States Patent [19]

Yamazaki et al.

[11] Patent Number: 5,891,416
[45] Date of Patent: *Apr. 6, 1999

[54] LITHIUM COBALTATE BASED POSITIVE ELECTRODE-ACTIVE MATERIAL FOR LITHIUM SECONDARY CELL AND METHOD OF MANUFACTURING SAME

[75] Inventors: Nobuyuki Yamazaki; Kathuyuki Negishi, both of Tokyo, Japan

[73] Assignee: Nippon Chemical Industrial Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 729,589

[22] Filed: Oct. 11, 1996

[51] Int. Cl.$^6$ ............................. C01G 51/00; C01D 15/00
[52] U.S. Cl. ............................................. 423/594
[58] Field of Search ............................. 423/594; 429/218

[56] References Cited

U.S. PATENT DOCUMENTS

| | | | |
|---|---|---|---|
| 4,686,160 | 8/1987 | Yoshino et al. | 429/213 |
| 5,478,673 | 12/1995 | Funatsu | 429/218 |
| 5,478,674 | 12/1995 | Miyasaka | 429/218 |
| 5,487,960 | 1/1996 | Tanaka | 429/218 |
| 5,503,930 | 4/1996 | Maruyama et al. | 429/218 |
| 5,589,298 | 12/1996 | Takada et al. | 429/218 |

*Primary Examiner*—Steven Bos
*Attorney, Agent, or Firm*—Oblon, Spivak, McClelland, Maier & Neustadt, P.C.

[57] ABSTRACT

A lithium cobaltate based positive electrode-active material for a lithium secondary cell consisting of lithium cobaltate (LiCoO$_2$) powder having particle properties of an n-value of at least 2.0 in Rosine-Rammler's distribution (R–λ). According to the present invention, it is possible to provide a lithium cobaltate based positive electrode-active material which is excellent in discharge capacity and capacity holding rate and gives high energy density, suitable for a lithium secondary cell.

4 Claims, 1 Drawing Sheet

LITHIUM COBALTATE BASED POSITIVE ELECTRODE-ACTIVE MATERIAL FOR LITHIUM SECONDARY CELL AND METHOD OF MANUFACTURING SAME

BACKGROUND OF THE INVENTION

1. Field of the Invention

The present invention relates to a lithium cobaltate based positive electrode-active material useful for a lithium secondary cell and a method of manufacturing same.

2. Discussion of the Background

Along with the recent rapid progress in electronic equipment toward portable and cordless domestic appliances, the use of lithium secondary cells as power sources for such compact electronic appliances has also increased. In 1980, Mizushima et al. reported the usefulness of lithium cobaltate as a positive electrode-active material for a lithium secondary cell ["Material Research Bulletin" vol. 15, p. 783–789 (1980)], and since then, research and development efforts regarding lithium cobaltate based positive electrode-active materials have been made, resulting in many proposals on the subject to date.

These conventional proposals cover techniques for achieving a high energy density for a positive electrode-active material such as, for example, one using the chemical composition $Li_xCoO_2$, where, $1.05 \leq x \leq 1.3$, of lithium cobaltate, thereby achieving a material rich in lithium (Japanese Patent Laid-Open No. 3-127454), one achieving in contrast a higher cobalt concentration by using the chemical composition $Li_xCoO_2$, where, $0 \leq x \leq 1$, (Japanese Patent Laid-Open No. 3-134969), ones doping metal ions such as Mn, W, Ni, La and Zr (Japanese Patent Laid-Open Nos. 3-201368, 4-328277, 4-319259 and 4-319260), and one setting out residual $Li_2CO_3$ of up to 10 wt % in lithium cobaltate (Japanese Patent Laid-Open No. 4-56064).

On the other hand, the known techniques requiring specific physical features of the lithium cobaltate based positive electrode-active material include one using an $LiCoO_2$ specific area of up to 2 $m^2/g$ (Japanese Patent Laid-Open No. 4-56064), one using amorphous $LiCoO_2$ (Japanese Patent Laid-Open No. 5-21066), ones imparting specific particle size properties to $LiCoO_2$ (Japanese Patent Laid-Open Nos. 4-33260 and 5-94822), and ones setting forth $LiCoO_2$ crystal grains having a specific X-ray diffraction intensity (Japanese Patent Laid-Open Nos. 3-272564 and 5-36414). Diverse and various proposals for methods of manufacturing a lithium cobaltate based positive electrode-active material include, for example, Japanese Patent Laid-Open Nos. 3-285262, 4-249074, 4-123762, 5-54886, 5-54888, 5-62678 and 5-182667.

In general, lithium cobaltate used as a positive electrode-active material for a lithium secondary cell is manufactured, for example, by mixing a lithium salt such as lithium carbonate and a cobalt compound such as cobalt oxide so as to give an atomic ratio of Li/Co within a range of from 0.9 to 1.2, and firing the resultant mixture at a temperature within a range of from 600° to 1,100° C . Physical and chemical properties of the resulting $LiCoO_2$ delicately and diversely vary with such conditions of the production as the heating rate and the firing atmosphere, which exert considerable effects on performance of the positive electrode-active material including such characteristics as discharge capacity and charge and discharge cycle.

The present inventors carried out extensive studies, placing emphasis on the foregoing phenomenon, and confirmed that particle properties of lithium cobaltate exerts an effect on cell properties, and particle size distribution within a specific range results in a lithium cobaltate based positive electrode-active material having excellent discharge capacity and discharge holding rate and giving a high energy density.

The present invention was developed on the basis of the foregoing findings and is aimed at providing a lithium cobaltate based positive electrode-active material for lithium secondary cell having a high energy density and a method of industrially manufacturing same.

SUMMARY OF THE INVENTION

A characterizing feature of the present invention lies in the lithium cobaltate based positive electrode-active material for a lithium secondary cell consisting of lithium cobaltate ($LiCoO_2$) powder having particle properties of an n-value of at least 2.0 in a Rosin-Rammler's distribution (R–λ).

DETAILED DESCRIPTION OF THE INVENTION

A larger n-value in the Rosin-Rammler's distribution (R–λ) usually leads to a smaller distribution width; and a smaller n-value corresponds to a wider distribution width. For the lithium cobaltate of the present invention, an n-value of at least 2.0 is a required prerequisite, and the cycle characteristic of repeating charge and discharge of a lithium secondary cell is considerably improved by using a lithium cobaltate satisfying the foregoing particle size distribution as a positive electrode-active material. If the n-value of lithium cobaltate powder is at least 2.0, or more preferably, at least 3.0, the particle size exerts almost no effect.

The lithium cobaltate based positive electrode-active material for a lithium secondary cell having the above-mentioned particle size distribution may be obtained by firing lithium carbonate and cobalt oxide, and the material may be manufactured by designating and using lithium carbonate powder having a particle size distribution with an average primary particle size of up to 10 μm and a maximum particle size of up to 40 μm.

More specifically, it is necessary in the present invention to select lithium carbonate fine powder having an average primary particle size (D50) of up to 10 μm and a maximum particle size of up to 40 μm as the raw material powder. It is thus possible by the selection of such a raw material to obtain a lithium cobaltate ($LiCoO_2$) powder provided with particle properties including an n-value in the Rosin-Rammler's distribution (R–λ) of at least 2.0. The cobalt oxide powder should preferably comprise fine particles having an average particle size of up to 5 μm and a maximum particle size of 30 μm. However because lithium cobaltate is not very dependent on the particle size distribution, restriction is not as strict as that on lithium carbonate powder.

Lithium carbonate having the foregoing particle size properties and cobalt oxide are mixed at a blending ratio Li/Co of near 1, or more preferably, within a range of from 0.99 to 1.10. The resultant mixture is charged into a heat-resistant crucible, and fired at a temperature within a range of from 600° to 1,100° C., or more preferably, from 800 to 1,000° C. The firing time within the foregoing temperature region is set to at least two hours, or more preferably, within a range of from 5 to 15 hours.

A lithium cobaltate ($LiCoO_2$) powder having particle properties including an n-value in the Rosin-Rammler's distribution (R-λ) of at least 2.0 is manufactured by crushing the fired product after the firing treatment.

The shape of the particle size distribution of the lithium cobaltate powder serving as the positive electrode-active material for a lithium secondary cell exerts an effect on cycle properties of repeated charge/discharge of the cell, and an n-value in the Rosin-Rammler's distribution (R-λ) as specified in the present invention brings about a remarkable improvement of the discharge cycle properties.

The lithium cobaltate based positive electrode-active material for a lithium secondary cell provided with such particle properties can be manufactured with a high reproducibility by selecting and using lithium carbonate fine particles having an average primary particle size of up to 10 μm and a maximum particle size of up to 40 μm as the raw material powder.

EXAMPLES

Figure 1:
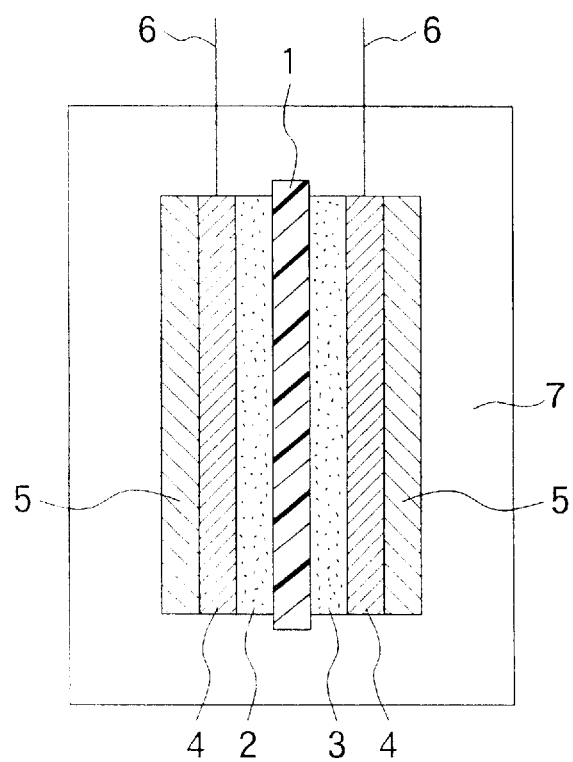
FIG. 1 is a explanatory sectional view of a lithium secondary cell assembled in the Examples.

Examples 1 to 4 and Comparative Examples 1 and 2

(1) Manufacture of lithium cobaltate based positive electrode-active material for a lithium secondary cell:

Lithium carbonate powders having different average primary particle sizes and maximum particle sizes and cobalt oxide having an average particle size of 3.5 μm as shown in Table 1 were weighed so as to give an Li-Co atomic ratio of 1 and sufficiently mixed in a mortar, thereby preparing uniform mixtures. Then, a firing treatment was applied by charging each mixture into an alumina crucible which was then placed in an electric heating furnace to heat under an ambient atmosphere until reaching a temperature of 900° C. The furnace was then kept at this temperature for ten hours. The resultant fired product was crushed to produce a lithium cobaltate based positive electrode-active material for a lithium secondary cell. The particle size distribution of the resultant lithium cobaltate powder was measured, and the results are shown in Table 1. The particle properties of the lithium carbonate powder was measured by a laser method type particle size distribution measuring instrument with methanol as the dispersant, and the particle size distribution of the lithium carbonate was similarly measured by the laser method particle size distribution measuring instrument with water as the dispersant.

(2) Preparation of a lithium secondary cell:

85 parts by of Lithium cobaltate ($LiCoO_2$) manufactured as above, 10 parts by weight of graphite powder and 5 parts by weight of polyvinylidene fluoride were mixed to form a positive electrode material, and this was dispersed in 2-methylpyrrolidone to prepare a kneaded paste. The resultant kneaded paste was applied to aluminum foil, dried and pressed under a pressure of 2 t/cm² to stamp a 2 cm square shape to form a positive electrode plate. A lithium secondary cell as shown in FIG. 1 was prepared by laminating individual members by the use of this positive electrode plate. In FIG. 1, numeral 1 denotes a separator; 2, a negative electrode; 3, a positive electrode; 4, a collector; 5, a tightening fitting; 6, an external terminal; and 7, an electrolyte. The negative electrode was a metal lithium foil. Further, the electrolyte 7 was constituted by 1-liter of a mixture of propylene carbonate with ethylene carbonate at a weight ratio of 1:1, in which 1 mol of $LiClO_4$ was dissolved.

(3) Evaluation of cell performance:

The prepared lithium secondary cell was operated and capacity holding rate were measured to evaluate the cell performance. The results are shown in Table 1 in comparison with the particle size properties of lithium carbonate and particle size distribution of lithium cobaltate ($LiCoO_2$). The capacity holding rate was caluculated by the following formula. Discharge capacity was measured by charging the positive electrode with 1 mA/cm² to 4.2 V, then discharging it to 2.7 V, and repeating this cycle of charging and discharging 20 times.

[Capacity holding rate]=[Discharge capacity in 20th cycle]/[discharge capacity in 1st cycle]×100

TABLE 1

| | particle properties of lithium carbonate | | | |
|---|---|---|---|---|
| | av. primary particle size (μm) | maximum particle size (μm) | n-value of (R-λ) | cell performance cap. holding rate (%) |
| CE 1 | 50 | 300 | 1.5 | 85 |
| CE 2 | 30 | 150 | 1.8 | 87 |
| Ex 1 | 10 | 40 | 2.3 | 90 |
| Ex 2 | 7 | 35 | 3.0 | 92 |
| Ex 3 | 4 | 13 | 3.1 | 94 |
| Ex 4 | 2 | 5 | 3.5 | 95 | note:
CE and Ex mean Comarative Example and Example, respectively.

As is clear from Table 1, all the lithium cobaltate based positive electrode-active materials according to the present invention, produced in the Examples had an n-value in the Rosin-Rammler's distribution (R-λ) of at least 2.0 and exhibited high performance as a lithium secondary cell, having excellent discharge capacity and capacity holding rate with high energy density. Comparative Examples outside the requirements of the present invention had in contrast poorer discharge capacity and capacity holding rate.

According to the present invention, as described above, it is possible to provide a lithium cobaltate based positive electrode-active material which is excellent in discharge capacity and capacity holding rate and gives a high energy density, suitable for a lithium secondary cell. According to the manufacturing method of the present invention, furthermore, it is possible to industrially produce the foregoing high-performance lithium cobaltate based positive electrode-active material for a lithium secondary cell with high reproducibility.

While the invention has been described in detail and with reference to specific embodiments thereof, it will be apparent to one of ordinary skill in the art that various changes and modifications can be made therein without departing from the spirit and scope thereof.

What is claimed is:

1. A lithium cobaltate based positive electrode-active material for a lithium secondary cell consisting of lithium cobaltate ($LiCoO_2$) powder having particle properties of an n-value of 2.3–3.5 in Rosin-Rammler's distribution (R-λ), obtained by a method comprising reacting lithium carbonate powder and cobalt oxide to form a lithium cobaltate, wherein said lithium carbonate powder has a particle size distribution with an average primary particle size of 2 to 10 μm and a maximum particle size of 5 to 40 μm.

2. The material of claim 1 wherein the n-value in Rosin Rammler's distribution (R-λ) is at least 3.0.

3. A method of manufacturing a lithium cobaltate based positive electrode-active material for a lithium secondary cell comprising reacting lithium carbonate powder and cobalt oxide to form a lithium cobaltate, wherein said lithium carbonate powder has a particle size distribution with an average primary particle size of 2 to 10 $\mu$m and a maximum particle size of 5 to 40 $\mu$m.

4. The method of claim 3 wherein the mean particle size and the maximum particle size of cobalt oxide are 5 $\mu$m or less and 30 $\mu$m, respectively.

* * * * *